(12) United States Patent
Takeda (10) Patent No.: US 11,685,314 B2
(45) Date of Patent: Jun. 27, 2023

(54) TONNEAU COVER

(71) Applicant: ASHIMORI INDUSTRY CO., LTD., Settsu (JP)

(72) Inventor: Hiroyoshi Takeda, Settsu (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 0 days.

(21) Appl. No.: 17/683,670

(22) Filed: Mar. 1, 2022

(65) Prior Publication Data

US 2022/0281385 A1 Sep. 8, 2022

(30) Foreign Application Priority Data

Mar. 2, 2021 (JP) .............................. JP2021-032626

(51) Int. Cl.
*B60R 5/04* (2006.01)

(52) U.S. Cl.
CPC .................................... *B60R 5/044* (2013.01)

(58) Field of Classification Search
CPC ......... B60R 5/044; B60R 5/045; B60R 13/01; B60R 7/02; B60J 7/141
USPC ....... 296/39.1, 136.03, 136.04, 37.16, 24.43, 296/24.4, 100.17, 100.18
See application file for complete search history.

(56) References Cited

U.S. PATENT DOCUMENTS

| | | | | |
|---|---|---|---|---|
| 2,911,253 A | * | 11/1959 | Dewey | B60R 13/01 296/39.1 |
| 4,877,283 A | * | 10/1989 | Little | B60J 7/104 296/10 |
| 9,381,864 B2 | * | 7/2016 | Shin | B62D 25/087 |
| 2008/0284203 A1 | | 11/2008 | Hansen et al. | |
| 2017/0144607 A1 | * | 5/2017 | Utsunomiya | B60R 5/048 |
| 2021/0146843 A1 | * | 5/2021 | Asai | B60R 5/045 |

FOREIGN PATENT DOCUMENTS

| | | |
|---|---|---|
| JP | 2001-191854 A | 7/2001 |
| JP | 2008-285152 A | 11/2008 |
| WO | WO-2019097880 A1 * 5/2019 | ............... B60Q 3/30 |

* cited by examiner

*Primary Examiner* — Joseph D. Pape
*Assistant Examiner* — Veronica M Shull
(74) *Attorney, Agent, or Firm* — Sughrue Mion, PLLC (57) ABSTRACT

A tonneau cover includes a sheet-shaped member, a hemming member sewn on an outer peripheral edge portion of the sheet-shaped member and forming a core material housing space, a loop-shaped core material housed in the core material housing space, and a frame. The frame includes a first divided frame member and a second divided frame member. At least one of the first divided frame member and the second divided frame member is formed with an edge housing portion and is provided with a contact portion. The edge housing portion forms an edge housing space. The edge housing space houses the outer peripheral edge portion, the hemming member, and the core material. The contact portion protrudes into the edge housing space to be in contact with a surface of the core material facing the sheet-shaped member via the hemming member.

4 Claims, 5 Drawing Sheets

TONNEAU COVER

CROSS-REFERENCE TO RELATED APPLICATIONS

This application is based upon and claims the benefit of priority from prior Japanese patent application No. 2021-032626, filed on Mar. 2, 2021, the entire contents of which are incorporated herein by reference.

TECHNICAL FIELD

The present disclosure relates to a tonneau cover mounted on a vehicle such as an automobile.

BACKGROUND

JP-A-2001-191854 discloses a tonneau cover including a cover main body configured with a sheet-shaped main cover, a peripheral edge member, and a flexible loop-shaped wire. The peripheral edge member is configured with leather or cloth sewn so as to surround an entire periphery of the main cover. The loop-shaped wire is disposed along the entire periphery of the main cover and is integrally attached to the peripheral edge member in a state of being completely wrapped by the peripheral edge member.

The attachment of the wire to the outer periphery of the main cover is performed by folding the peripheral edge member to form a bag shape, wrapping the wire in a portion of the peripheral edge member formed in the bag shape, and sewing the peripheral edge member that is wrapping the wire on an outer periphery of the main cover.

However, it is difficult to sew the peripheral edge member on the main cover while wrapping the wire in the peripheral edge member. Therefore, in a direction along the outer periphery of the wire, a distance from the wire to the outer periphery of the main cover may be uneven. In this case, slack and wrinkles may occur in the main cover at a portion where a force with which the wire pulls the outer periphery of the main cover toward an outer peripheral side is weak.

SUMMARY

An object of the present disclosure is to provide a tonneau cover in which slack and wrinkles are unlikely to occur in a sheet-shaped member.

A tonneau cover configured to cover a rear baggage compartment of a vehicle, the tonneau cover including:

a sheet-shaped member;

a hemming member sewn on an outer peripheral edge portion of the sheet-shaped member and forming an elongated core material housing space between an inner surface of the hemming member and the outer peripheral edge portion;

a loop-shaped core material housed in the core material housing space; and a frame attached to at least a part of the outer peripheral edge portion of the sheet-shaped member, in which the frame includes a first divided frame member and a second divided frame member sandwiching the hemming member in at least a part of the outer peripheral edge portion of the sheet-shaped member, and at least one of the first divided frame member and the second divided frame member is formed with an edge housing portion and is provided with a contact portion, the edge housing portion forming an edge housing space between the first divided frame member and the second divided frame member, the edge housing space housing the outer peripheral edge portion of the sheet-shaped member, the hemming member, and the core material, the contact portion protruding into the edge housing space to be in contact with a surface of the core material facing the sheet-shaped member via the hemming member.

According to the tonneau cover, the slack and the wrinkles are unlikely to occur in the sheet-shaped member.

DESCRIPTION OF EMBODIMENTS

Figure 1:
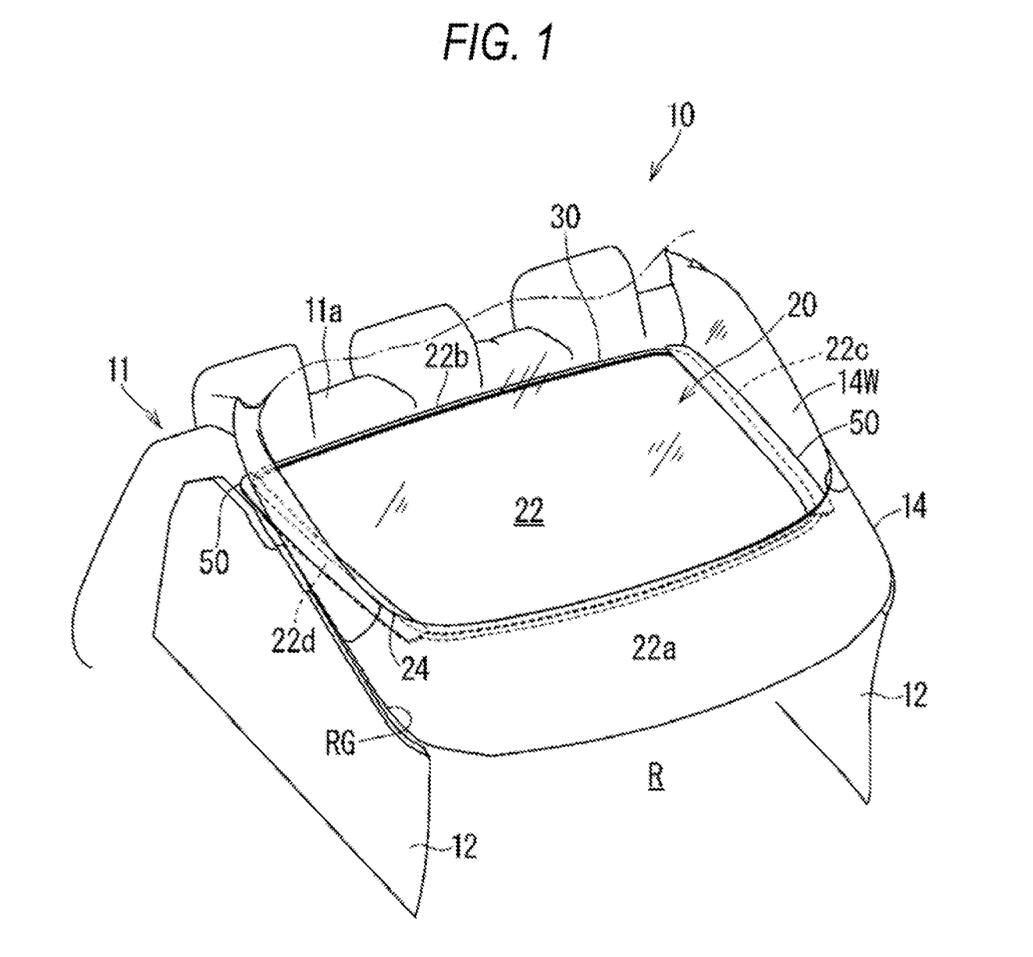
FIG. 1 is an illustrative view showing a state where a tonneau cover according to an embodiment is mounted on a vehicle.

Hereinafter, a tonneau cover according to an embodiment will be described. The phrase "at least one of A and B" should be understood to mean "only A, only B, or both A and B." FIG. 1 is an illustrative view showing a state where a tonneau cover 20 is mounted on a vehicle 10. FIG. 1 is a view of a part of a rear portion of the vehicle 10 as viewed obliquely from above.

<Position of Tonneau Cover in Vehicle>

In FIG. 1, a rear seat 11, both side walls 12 of a rear baggage compartment R, and a back door 14 are shown. As shown in FIG. 1, the vehicle 10 is a vehicle called a hatch bike type, a station wagon type, or the like. The vehicle 10 includes a front seat (not shown) and the rear seat 11 located behind the front seat. The rear baggage compartment R extends behind the rear seat 11. The side walls 12 that extend in front-rear and upper-lower directions are provided on both sides of the rear baggage compartment R. The side wall 12 is, for example, an interior member that is made of resin and extends to an inside of a metal body. A floor (not shown) that extends in front-rear and left-right directions is provided below the rear seat 11.

The rear baggage compartment R is opened via a rear gate RG. The rear gate RG may be opened at a position where baggage can be taken in and out of the rear baggage compartment R from a vehicle outer rear side opposite to the rear seat 11. In FIG. 1, the rear gate RG extends in a region from upper side of a rear portion of the baggage compartment R to directly above the baggage compartment R. The present invention is not limited to the example shown in FIG. 1, and the rear gate can be provided in any region.

The rear gate RG is opened and closed by the back door 14. An upper portion of the back door 14 is supported by a vehicle body via a hinge (not shown). The back door 14 extends obliquely downward and rearward from the hinge to close the rear gate RG. In this state, an end portion of the back door 14 on a side far from the hinge is lifted obliquely rearward, and the back door 14 is opened. In a state where the hack door 14 is opened, the back door 14 is extends obliquely upward and rearward from the hinge. The back door 14 is provided with a rear window 14W. In a state where the back door 14 is closed, at least a part of the rear window 14W extends above a backrest portion 11a of the rear seat 11.

The tonneau cover 20 covers the rear baggage compartment R of the vehicle 10. For example, the tonneau cover 20 is formed in a shape and size that the tonneau cover 20 can entirely extend in a horizontal direction in the rear baggage compartment R at a height position of an upper portion of the backrest portion 11a of the rear seat 11. The tonneau cover 20 can cover a space inside the rear baggage compartment R, particularly a space behind the backrest portion 11a, from above at the height position of the upper portion of the backrest portion 11a. Accordingly, the tonneau cover 20 can cover an object stored in the rear baggage compartment R from above. Since a line of sight directed from an outside to an inside of the vehicle through the rear window 14W is blocked by the tonneau cover 20, the object in the rear baggage compartment R is hidden from the outside of the vehicle.

The tonneau cover 20 of the vehicle may be supported by the back door 14. In this case, for example, the tonneau cover 20 may be supported in a fixed posture by a lower portion of the rear window 14W of the back door 14 such that the tonneau cover 20 is in a horizontal posture in a state where the back door 14 is closed. For example, one end portion of a frame 50, which will be described later, may be supported by the back door 14 by a fitting structure or the like. In this case, when the back door 14 is opened, the tonneau cover 20 is moved upward together with the back door 14, and when the back door 14 is closed, the tonneau cover 20 is moved downward together with the back door 14 to cover the rear baggage compartment R. In this state, the tonneau cover 20 may be located below the rear window 14W and may be provided at a position where the tonneau cover 20 does not obstruct a rear view of a driver.

The tonneau cover 20 may be supported by one or both of the side walls 12 and the backrest portion 11a. For example, the side walls 12 are formed with a support surface for supporting placement of the tonneau cover 20, or a concave portion or a concave groove in which a part of an outer peripheral portion of the tonneau cover 20 is fitted. The tonneau cover 20 may be supported by the support surface, the concave portion, or the concave groove, and the tonneau cover 20 may keep a state where the tonneau cover 20 covers the rear baggage compartment R. In this case, regardless of opening and closing of the back door 14, the tonneau cover 20 keeps a state of covering the rear baggage compartment R.

<Overall Configuration of Tonneau Cover>

Figure 2:
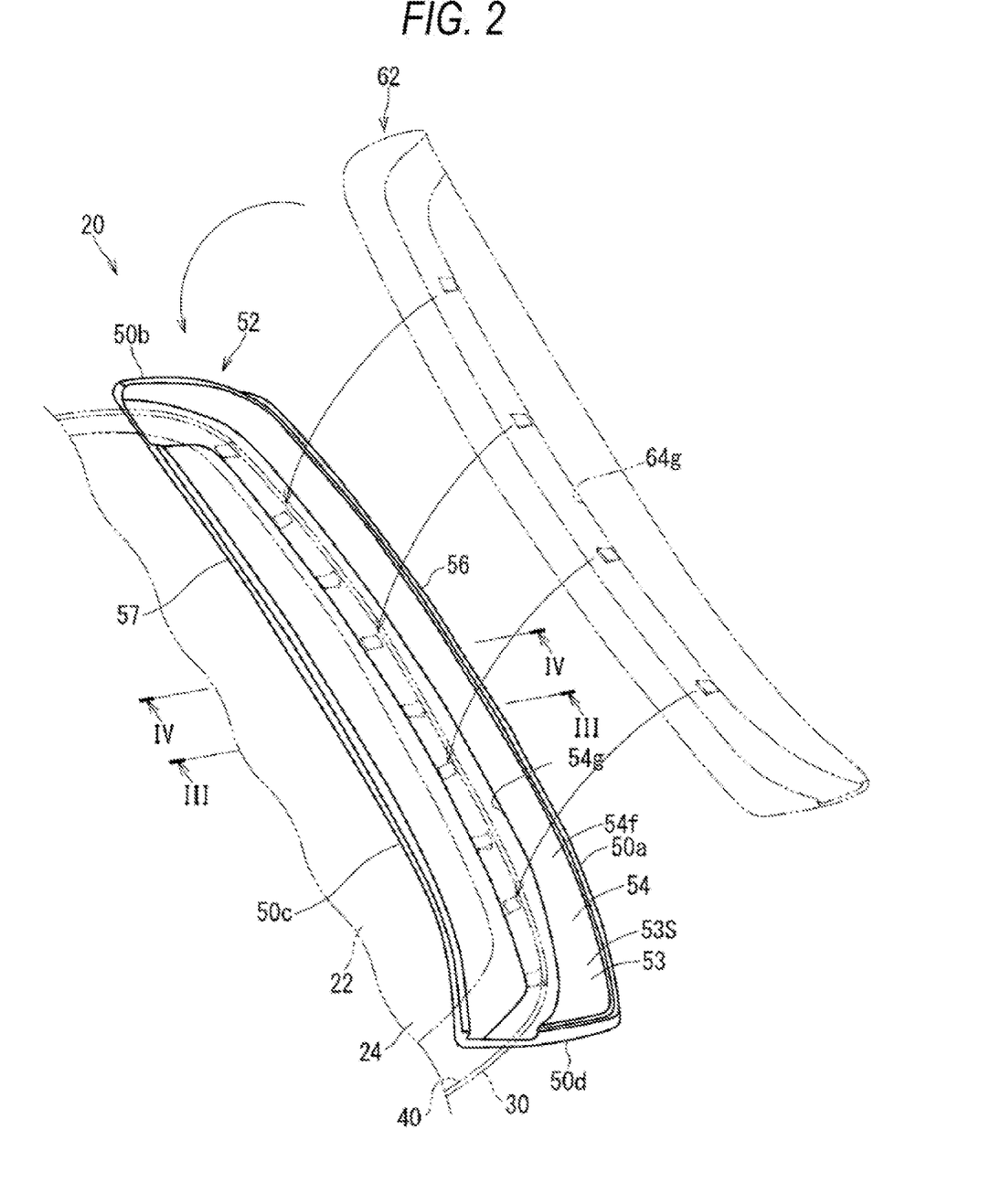
FIG. 2 is an exploded perspective view of one side portion of the tonneau cover.
Figure 3:
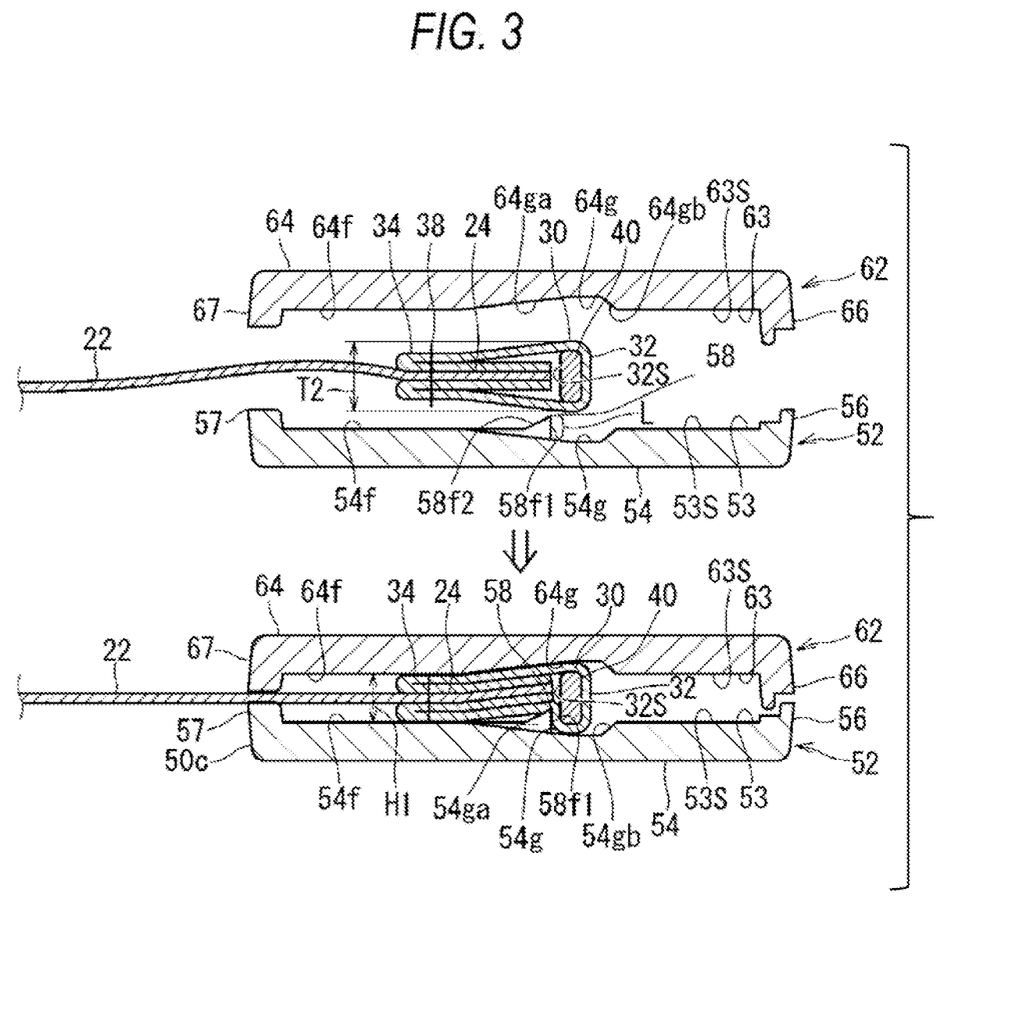
FIG. 3 is an illustrative view of a cross section taken along a line III-III of FIG. 2.
Figure 4:
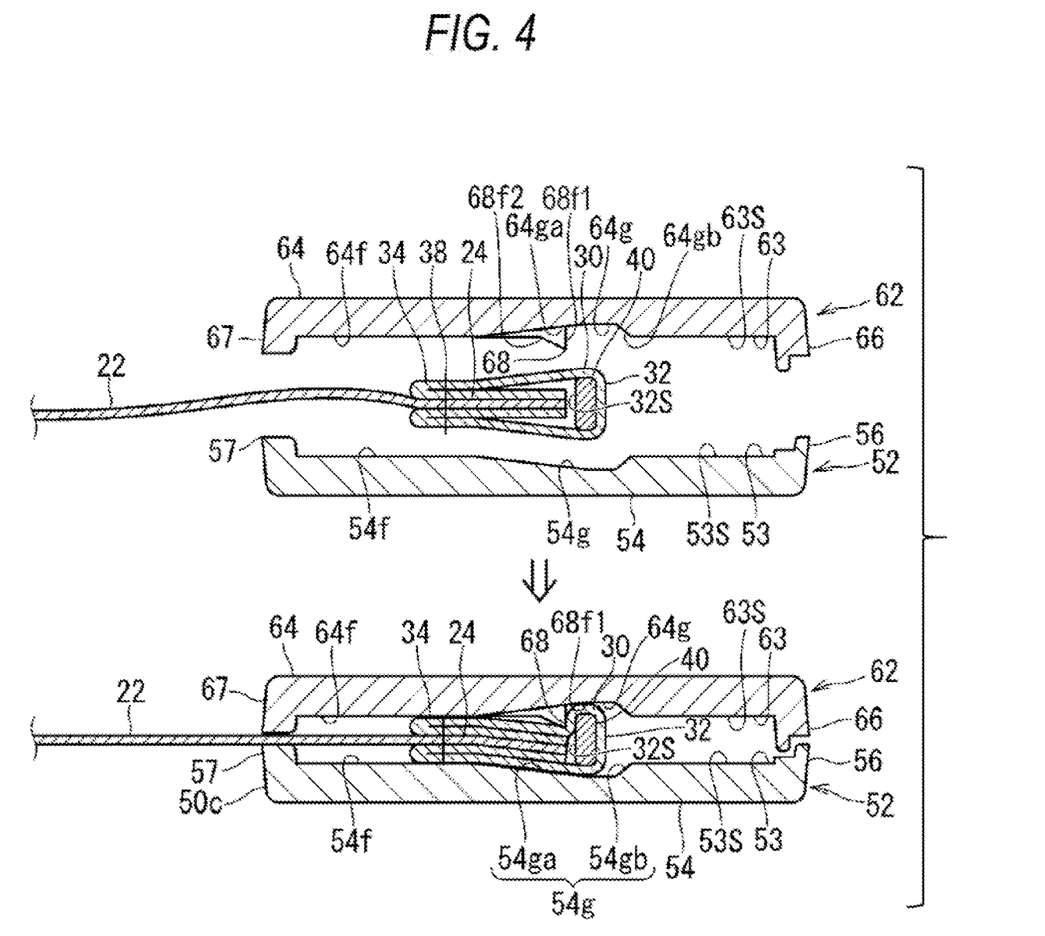
FIG. 4 is an illustrative view of a cross section taken along a line IV-IV of FIG. 2.

FIG. 2 is an exploded perspective view of one side portion of the tonneau cover 20. In FIG. 2, a second divided frame member 62 separated from a first divided frame member 52 and vertically inverted is indicated by a two-dot chain line. FIGS. 3 and 4 are illustrative views showing a state where an outer peripheral edge portion 24, a hemming member 30, and a core material 40 are sandwiched between the pair of divided frame members 52 and 62. FIG. 3 is an illustrative view of a cross section taken along a line III-III of FIG. 2, and FIG. 4 is an illustrative view of a cross section taken along a line IV-IV of FIG. 2.

The tonneau cover 20 includes a sheet-shaped member 22 the hemming member 30, the core material 40, and the frame 50.

The sheet-shaped member 22 is configured with a flexible sheet. The sheet may be, for example, a resin sheet, cloth, leather (natural leather or artificial leather), or a net. The sheet-shaped member may have a single-layer structure or a multi-layer structure.

The sheet-shaped member 22 has an extension to an extent that the sheet-shaped member 22 can cover the rear baggage compartment R. Here, the sheet-shaped member 22 is formed to have a shape and a size to an extent that the sheet-shaped member 22 can cover the rear baggage compartment R at the height position of the upper portion of the rear baggage compartment R. The sheet-shaped member 22 is formed in a shape surrounded by a curved line that is convex toward an outer peripheral side. A part of an outer periphery of the sheet-shaped member 22 may be a straight line. In the present embodiment, the sheet-shaped member 22 is formed in a shape of an isosceles trapezoid in which an upper base 22a is shorter than a lower base 22b, and the upper base 22a and two oblique sides 22c and 22d are connected to each other via a curved connection portion that is convex outward, and the lower base 22b and the two oblique sides 22c and 22d are connected to each other via the curved connection portion that is convex outward. In a state where the tonneau cover 20 is mounted on the vehicle 10, the lower base 22b is faced a side of the backrest portion 11a of the rear seat 11, and the upper base 22a is faced a side of the back door 14 side. The upper base 22a, the lower base 22b, and the oblique sides 22c and 22d may also have curved lines that are convex outward, and bending radii of these portions are larger than a bending radius of the curved connection portion. In the following description, the oblique side 22c (or the oblique side 22d) may be described as including the curved connection portion. The sheet-shaped member 22 may be understood to have a shape obtained by applying deformation, by which the entire sheet-shaped member 22 is surrounded by a curved line, to a polygonal shape such that a curvature radius becomes larger toward a center of each side and becomes smaller toward a position corresponding to a corner portion.

In the following description, a direction toward an outside with respect to a center of the sheet-shaped member 22 may be referred to as an outer side or an outer peripheral side, and a direction toward the center may be referred to as an inner side or an inner peripheral side.

The hemming member 30 is a member sewn on the outer peripheral edge portion 24 of the sheet-shaped member 22. For example, the hemming member 30 includes a flexible band-shaped sheet. Similar to the sheet-shaped member 22, the sheet may be, for example, a resin sheet, cloth, leather (natural leather or artificial leather), or a net. The sheet included in the hemming member 30 may have a single-layer structure or a multi-layer structure.

The hemming member 30 is formed in a band shape having a dimension that enables the hemming member 30 to be sewn on the entire outer peripheral edge portion 24 of the sheet-shaped member 22, for example, a length equal to or longer than a length of the outer peripheral edge portion 24. End portions of the hemming member 30 may be overlapped with each other in a state where the hemming member 30 is sewn on the outer peripheral edge portion 24 of the sheet-shaped member 22.

The above description assumes that there is one hemming member 30. However, the hemming member may be divided into a plurality of parts in a direction along the outer peripheral edge portion. In this case, the plurality of hemming members may be sewn on the entire outer peripheral edge portion of the sheet-shaped member continuously.

The hemming member 30 is formed in a width such that the core material 40 can be housed in a middle in a width direction of the hemming member 30 and both sides in the width direction can be sewn on the outer peripheral edge portion 24 of the sheet-shaped member 22. That is, the hemming member 30 includes a core material housing portion 32 and a pair of sewn portions 34 on both outer sides of the core material housing portion 32.

The core material housing portion 32 is a band-shaped region located on a central portion of the hemming member 30 in a width direction. The central portion of the core material housing portion 32 in the width direction is bent to bring both side portions of the core material housing portion 32 in the width direction close to each other, and the core material housing portion 32 is deformed to form a ring when observed in a transverse cross section of the core material housing portion 32 (a cross section orthogonal to a longitudinal direction of the core material housing portion 32). Accordingly, a core material housing space 32S that can house the core material 40 is formed in the core material housing portion 32.

The sewn portions 34 are a pair of band-shaped regions located on both sides of the hemming member 30 in a width direction. In the present embodiment, the sewn portion 34 is formed in a double structure by folding a side portion of the sheet included in the hemming member in two along a line along an extension direction of the sheet. In this case, an edge of the sewn portion 34 is preferably folded inward. The sewn portion 34 may have a single-layer structure, a three-layer structure, or more-layer structure.

In a state where the core material housing space 32S is formed by the core material housing portion 32, the pair of sewn portions 34 on both sides of the hemming member 30 in the width direction are sewn on the outer peripheral edge portion 24 of the sheet-shaped member 22 by a sewing thread 38, and the elongated core material housing space 32S is formed, on an outer peripheral side of the sheet-shaped member 22, between an inner surface of the hemming member 30 and the outer peripheral edge portion 24. In the present embodiment, one sewn portion 34 is disposed on one main surface side of the outer peripheral edge portion 24, and the other sewn portion 34 is disposed on the other main surface side of the outer peripheral edge portion 24. Then, in a state where the outer peripheral edge portion 24 is sandwiched between the pair of sewn portions 34, the pair of sewn portions 34 are sewn on the outer peripheral edge portion 24. Accordingly, the hemming member 30 has a symmetrical structure on both surface sides of the sheet-shaped member 22, and a pulling force by the core material 40 housed in the core material housing space 32S is transmitted to both surface sides of the sheet-shaped member 22 via the hemming member 30 in a well-balanced manner. The pair of overlapped sewn portions 34 may be disposed on a surface on one side of the outer peripheral edge portion 24 and sewn on the outer peripheral edge portion 24.

The core material 40 is a loop-shaped member, and can be elastically deformed on an inner peripheral side and an outer peripheral side of the loop-shaped. The core material 40 is made of, for example, spring steel or an elastically deformable resin. The core material 40 is formed in a shape larger than the outer peripheral edge portion 24 of the sheet-shaped member 22 to such an extent that the outer peripheral edge portion 24 of the sheet-shaped member 22 can be pulled toward the outer peripheral side via the sewn portions 34. Since the core material 40 is housed in the core material housing space 32S formed by the sewn portions 34, the core material 40 is disposed over the entire outer peripheral edge portion 24 of the sheet-shaped member 22. Accordingly, the core material 40 can keep the sheet-shaped member 22 in a flatly developed state via the sewn portions 34. Further, the outer peripheral edge portion 24 can be pulled toward an outer peripheral side by an elastic force caused by the core material 40 expanding toward the outer peripheral side. Accordingly, the sheet-shaped member 22 is tightly stretched in a planar manner.

The core material 40 may have any transverse cross-sectional shape (a cross-sectional shape in a direction orthogonal to an extension direction of the core material 40), and may have a circular shape, an elliptical shape, or a rectangular shape. FIGS. 3 and 4 show an example in which the transverse cross-sectional shape of the core material 40 is a rectangular shape that is short in an inner-outer direction of the core material 40 and has rounded corners.

The frame 50 is a member attached to at least a part of the outer peripheral edge portion 24 of the sheet-shaped member 22. The frame 50 is a rigid member, for example, an elongated member that is unlikely to bend than the core material 40. The frame 50 is made of, for example, resin. Since a portion of the outer peripheral edge portion 24 of the sheet-shaped member 22 to which the frame 50 is attached is unlikely to be deformed than other portions, the tonneau cover 20 is easily kept in a constant shape.

In the present embodiment, the tonneau cover 20 includes two frames 50. The two frames 50 are attached to the outer peripheral edge portion 24 of the sheet-shaped member 22 at positions facing each other. Here, the two frames 50 are attached to the two oblique sides 22c and 22d of the outer peripheral edge portion 24 of the sheet-shaped member 22. The two oblique sides 22c and 22d faces each other.

<Frame>

In the tonneau cover 20, the core material 40 in the core material housing space 32S is in contact with an inner peripheral surface of the core material housing portion 32 from a sheet-shaped member 22 side. Then, the elastic force caused by the core material 40 expanding toward the outer peripheral side is transmitted to the outer peripheral edge portion 24 of the sheet-shaped member 22 via the core material housing portion 32 and the sewn portions 34. Accordingly, the outer peripheral edge portion 24 is pulled to the outer peripheral side of the sheet-shaped member 22. In a case where the force by which the core material 40 pulls the outer peripheral edge portion 24 of the sheet-shaped member 22 toward the outer peripheral side is substantially uniform over the entire outer peripheral edge portion of the sheet-shaped member 22, the sheet-shaped member 22 is kept in a tightly stretched state without slack and wrinkles.

However, in a state where the core material 40 is housed in the core material housing space 32S in the core material housing portion 32, it is difficult to sew the pair of sewn portions 34 on the outer peripheral edge portion 24 of the sheet-shaped member 22. Therefore, it is difficult to align sewing positions of the pair of sewn portions 34 and the outer peripheral edge portion 24 in the entire outer peripheral edge portion 24. Due to misalignment of these sewing positions or the like, a situation may occur in which a position of the core material 40 with respect to the outer peripheral edge portion 24 of the sheet-shaped member 22 is relatively different in an extension direction of the outer peripheral edge portion 24. Then, in a portion of the core material 40 located relatively close to the outer peripheral edge portion 24, the force that pulls the outer peripheral edge portion 24 of the sheet-shaped member 22 toward the outer peripheral side may be relatively weak. Slack or wrinkles may occur in the sheet-shaped member 22 on an inner side of the portion or the like.

The frame 50 is provided with a configuration for preventing the sheet-shaped member 22 from being slackened and wrinkled. The frame 50 will be described in more detail. In the present embodiment, since the two frames 50 have a bilaterally symmetrical structure, the following description will focus on one of the frames 50.

The frame 50 is formed as an elongated member. More specifically, the frame 50 is formed in an elongated shape corresponding to one oblique side 22c (or oblique side 22d) of the sheet-shaped member 22. The frame 50 is formed as a flat member in a thickness direction of the sheet-shaped member 22. An outward-facing portion 50a of the frame 50 is formed in a shape curved in accordance with a curved shape of the oblique side 22c (or the oblique side 22d). One-side end portion 50b of the frame 50 draws a smoothly continuous curved line with respect to the outward-facing portion 50a. An inward-facing portion 50c of the frame 50 is formed in a shape curved in accordance with the curved shape of the oblique side 22c (or the oblique side 22d) on an inner side of the outward-facing portion 50a. The-other-side end portion 50d of the frame 50 extends along a direction intersecting the outward-facing portion 50a and the inward-facing portion 50c.

The oblique side 22c is disposed inside the outward-facing portion 50a and the one-side end portion 50b of the frame 50. A curved connection portion on one side of the oblique side 22c passes through a portion of the inward-facing portion 50c close to the one-side end portion 50b and extends to an outside of the frame 50. A curved connection portion on the other side of the oblique side 22c extends to the outside of the frame 50 through the-other-side end portion 50d.

The frame 50 includes the first divided frame member 52 and the second divided frame member 62. The first divided frame member 52 and the second divided frame member 62 sandwich the hemming member 30 in at least a part of the outer peripheral edge portion 24 of the sheet-shaped member 22. In the present embodiment, the hemming member 30 is sandwiched in the oblique side 22c (or the oblique side 22d) of the sheet-shaped member 22.

More specifically, the first divided frame member 52 and the second divided frame member 62 are members obtained by dividing the frame 50 into two in the thickness direction thereof (the thickness direction of the sheet-shaped member 22). Edge housing portions 53 and 63 are formed in at least one of the first divided frame member 52 or the second divided frame member 62. The edge housing portion may be formed only in the first divided frame member 52. The edge housing portion may be formed only in the second divided frame member 62. The edge housing portions 53 and 63 form edge housing spaces 53S and 63S between the first divided frame member 52 and the second divided frame member 62. The edge housing spaces 53S and 63S are spaces for housing the outer peripheral edge portion 24 of the sheet-shaped member 22, the hemming member 30, and the core material 40.

In the present embodiment, the edge housing portion 53 for forming the edge housing space 53S is formed in a portion of the first divided frame member 52 facing the second divided frame member 62. Further, the edge housing portion 63 for forming the edge housing space 63S is formed in a portion of the second divided frame member 62 facing the first divided frame member 52.

More specifically, the first divided frame member 52 is a member integrally molded from resin or the like by a mold, and includes a base plate portion 54, an outer wall portion 56, and an inner wall portion 57. The base plate portion 54 is a portion formed in a plate shape that extends along an extension direction of the sheet-shaped member 22. Similar to an outer shape of the frame 50, an outer shape of the base plate portion 54 is formed in an elongated shape corresponding to a shape of at least a part of the outer peripheral edge portion 24. In the present embodiment, the outer shape of the base plate portion 54 is formed in an elongated shape corresponding to an extended shape of the oblique side 22c (or the oblique side 22d). The outer wall portion 56 and the inner wall portion 57 protrude from the base plate portion 54 toward a side of the second divided frame member 62. The outer wall portion 56 is formed in a portion of the base plate portion 54 from the one-side end portion 50b to a middle of the-other-side end portion 50d via the outward-facing portion 50a. The inner wall portion 57 is formed in a portion of the inward-facing portion 50c from a position away from the one-side end portion 50b to the-other-side end portion 50d. The edge housing portion 53 includes the base plate portion 54, the outer wall portion 56, and the inner wall portion 57. A space surrounded by the base plate portion 54, the outer wall portion 56, and the inner wall portion 57 is the edge housing space 53S that can house the outer peripheral edge portion 24, the hemming member 30, and the core material 40. The edge housing space 53S is opened toward the side of the second divided frame member 62. Further, a portion without a wall is formed between the outer wall portion 56 and the inner wall portion 57 along an entire circumference of the base plate portion 54. The outer peripheral edge portion 24, the hemming member 30, and the core material 40 extend outward from an inside of the frame 50 through the portion without the wall.

The second divided frame member 62 is a member integrally molded from resin or the like by a mold. The second divided frame member 62 has a symmetrical structure with respect to the first divided frame member 52 with a facing surface with respect to the first divided frame member 52 as a plane of symmetry. That is, the second divided frame member 62 includes a base plate portion 64 corresponding to the base plate portion 54, an outer wall portion 66 corresponding to the outer wall portion 56, and an inner wall portion 67 corresponding to the inner wall portion 57. An outer edge of the outer wall portion 56 protrudes from an inner edge of the outer wall portion 56, and conversely, an outer edge of the outer wall portion 66 is recessed from an inner edge of the outer wall portion 66. Therefore, in a state where the outer wall portions 56 and 66 are faced and abutted each other, tip portions of the outer wall portions 56 and 66 are fitted to each other and overlapped with each other, and a gap is unlikely to occur therebetween. The edge housing portion 63 includes the base plate portion 64, the outer wall portion 66, and the inner wall portion 67. A space surrounded by the base plate portion 64, the outer wall portion 66, and the inner wall portion 67 is the edge housing space 63S that can house the outer peripheral edge portion 24, the hemming member 30, and the core material 40. The edge housing space 63S is opened toward a side of the first divided frame member 52.

The present invention is not limited to the above example, and the edge housing portion may be formed in only one of the first divided frame member and the second divided frame member. For example, the edge housing portion that forms the edge housing space may be formed in a portion of the first divided frame member facing the second divided frame member, and a portion of the second divided frame member facing the first divided frame member may be formed in a planar shape that closes an opening of the edge housing portion.

In a state where the first divided frame member 52 and the second divided frame member 62 are combined, the outer peripheral edge portion 24, the hemming member 30, and the core material 40 are housed in a space including the edge housing space 53S and the edge housing space 63S. In the present embodiment, a distance H1 between an inner surface 54*f* of the base plate portion 54 and an inner surface 64*f* of the base plate portion 64 is set to a size that can house the sheet-shaped member 22 and the sewn portions 34 of the hemming member 30 sewn on the sheet-shaped member 22. In the present embodiment, the sewn portion 34 having the double structure is sewn on the outer peripheral edge portion 24. The distance H1 is set to a size obtained by adding a thickness of the pair of sewn portions 34 sewn on the outer peripheral edge portion 24 to a thickness of the outer peripheral edge portion 24.

In the present embodiment, a total thickness T2 of the core material 40 and a portion of the hemming member 30 that surrounds the core material 40 is larger than the distance H1. Here, since the core material housing portion 32 covers both sides of the first divided frame member 52 and the second divided frame member 62 with respect to the core material 40, a dimension obtained by adding a thickness of the two core material housing portions 32 to a dimension of the core material 40 in the thickness direction of the sheet-shaped member 22 is the thickness T2. In this case, the core material 40 and the hemming member 30 that covers the core material 40 are unlikely to fit between the inner surface 54*f* of the base plate portion 54 and the inner surface 64*f* of the base plate portion 64. Therefore, grooves 54*g* and 64*g* are formed along a path on which the core material 40 in the base plate portions 54 and 64 is disposed. The grooves 54*g* and 64*g* are formed in a shape corresponding to a shape of the oblique side 22*c* (or the oblique side 22*d*). The grooves 54*g* and 64*g* are formed between the inward-facing portion 50*c* and the outward-facing portion 50*a* from a position of the inward-facing portion 50*c* close to the one-side end portion 50*b* to the-other-side end portion 50*d*. A depth of the grooves 54*g* and 64*g* are set such that the grooves 54*g* and 64*g* can house the core material 40 and the hemming member 30 that surrounds the core material 40. In other words, the grooves 54*g* and 64*g* are formed such that a dimension between bottoms of the grooves 54*g* and 64*g* is equal to or larger than the thickness T2 in at least a portion between an inner wall and an outer wall.

It is not essential to form the partial grooves 54*g* and 64*g* in the base plate portions 54 and 64 as described above, and the core material 40 and the hemming member 30 that surrounds the core material 40 may be arranged in an entire space between the base plate portions 54 and 64. When the grooves 54*g* and 64*g* are formed as described above, a position where the core material 40 is disposed between the base plate portions 54 and 64 is limited to a region in which the grooves 54*g* and 64*g* are formed.

In the present embodiment, the grooves 54*g* and 64*g* are formed in a triangular groove shape. Surfaces 54*ga* and 64*ga* close to the inward-facing portion 50*c* are formed in an inclined surface shape where an inclination angle with respect to other surfaces of the base plate portions 54 and 64 (or the sheet-shaped member 22) is smaller than that of surfaces 54*gb* and 64*gb* close to the outward-facing portion 50*a*, and where a length of the inclined surface is longer in an inner-outer direction than that of surfaces 54*gb* and 64*gb* close to the outward-facing portion 50*a*. Accordingly, since the hemming member 30 that surrounds the core material 40 is guided to a range having a certain depth or more in the grooves 54*g* and 64*g*, the region in which the core material 40 is disposed is further limited. The grooves 54*g* and 64*g* may have a shape including a portion in which the same depth portion is continuous in a direction connecting the inward-facing portion 50*c* and the outward-facing portion 50*a*. Further, it is not essential to provide the grooves 54*g* and 64*g*.

In a state where the first divided frame member 52 and the second divided frame member 62 are combined, the outer peripheral edge portion 24 of the sheet-shaped member 22, the hemming member 30, and the core material 40 are sandwiched between the first divided frame member 52 and the second divided frame member 62 in the following state.

The core material 40 is disposed in an elongated space formed by the grooves 54*g* and 64*g*. The core material 40 extends to an outside from a position of the inward-facing portion 50*c* of the frame 50 closer to the one-side end portion 50*b* and the-other-side end portion 50*d*. The hemming member 30 in a state of covering the core material 40 is disposed in an elongated space formed by the edge housing spaces 53S and 63S. The core material housing portion 32, of the hemming member 30, that surrounds the core material 40 is disposed in a space formed by the grooves 54*g* and 64*g*, together with the core material 40. Particularly, the core material 40 and the core material housing portion 32 that surrounds the core material 40 are arranged in a region of the grooves 54*g* and 64*g*, the region having a depth that can house the core material 40 and the core material housing portion 32 that surrounds the core material 40 (a deepest position and a peripheral region thereof).

The pair of sewn portions 34 of the hemming member 30 sewn on the outer peripheral edge portion 24 of the sheet-shaped member 22 are directed from the grooves 54*g* and 64*g* toward a side of the inner wall portion 57, and are arranged between the inner surfaces 54*f* and 64*f* of the base plate portions 54 and 64. The inner surfaces 54*f* and 64*f* of the base plate portions 54 and 64 are portions of the inner surfaces of the base plate portions 54 and 64 where the grooves 54*g* and 64*g* are not formed. In the present embodiment, the inner surfaces 54*f* and 64*f* of the base plate portions 54 and 64 are formed in a flat surface. The outer peripheral edge portion 24 of the sheet-shaped member 22 is disposed between the inner surfaces 54*f* and 64*f* on inner sides of the base plate portions 54 and 64, in a state where the outer peripheral edge portion 24 is sandwiched between the pair of sewn portions 34. In FIGS. 3 and 4, the outer peripheral edge portion 24 reaches a vicinity of an inner peripheral side of the core material 40, but this is not essential. The outer peripheral edge portion 24 may extend to an outer peripheral side of a position sewn on the sewn portions 34. The sheet-shaped member 22 extends between the pair of sewn portions 34, passes between the pair of inner wall portions 57 and 67, and extends to an outside from the frame 50.

The combined state of the first divided frame member 52 and the second divided frame member 62 may be achieved by any configuration. For example, the first divided frame member 52 and the second divided frame member 62 may be joined by thermal welding. More specifically, tip edges of the outer wall portions 56 and 66 may be melted by heat and joined to each other. Further, protrusions that can be abutted against each other may be formed inside the first divided frame member 52 and the second divided frame member 62, and the protrusions may be thermally welded to each other. Further, the first divided frame member 52 and the second divided frame member 62 may be kept in a combined state by a lock structure that are engaged with each other, an adhesive, a screw, a rivet, or the like.

The core material 40 and the core material housing portion 32 that surrounds the core material 40 are arranged in the grooves 54g and 64g.

On at least one of the edge housing portions 53 and 63 of the first divided frame member 52 and the second divided frame member 62, contact portions 58 and 68 that can be in contact with a surface of the core material 40 facing the sheet-shaped member 22 via the hemming member 30 are formed. The contact portion may be formed only on the edge housing portion 53 of the first divided frame member 52. The contact portion may be formed only on the edge housing portion 63 of the second divided frame member 62. In the present embodiment, an example is shown in which the contact portion 58 is formed on the edge housing portion 53 of the first divided frame member 52, and the contact portion 68 is formed on the edge housing portion 63 of the second divided frame member 62.

The contact portions 58 and 68 are formed as partial protrusions in an extension direction of the grooves 54g and 64g. The contact portion may be an elongated protrusion that extends in the extension direction of the grooves 54g and 64g.

The contact portion 58 is formed at a position closer to the inner wall portion 57 than a deepest portion of the groove 54g. That is, the contact portion 58 is formed to protrude from the surface 54ga. When the contact portion 58 is viewed along the extension direction of the groove 54g, a surface 58/1 of the contact portion 58 on a side of the outer wall portion 56 intersects with the sheet-shaped member 22 (or the inner surface 54f). A surface 58/2 of the contact portion 58 on the side of the inner wall portion 57 intersects with the sheet-shaped member 22 (or the inner surface 54f). The surface 58/2 is formed as a surface whose inclination angle changes in the middle, but this is not essential. The surface 58/1 forms an angle closer to being perpendicular to the sheet-shaped member 22 (or the inner surface 54f) than the surface 58/2. The surface 58/1 may be perpendicular to the sheet-shaped member 22 (or the inner surface 54f). When the surface 58/1 is perpendicular to the sheet-shaped member 22 (or the inner surface 54f), the core material 40 can be more reliably positioned at a constant position on the side of the inner wall portion 57.

A distance between a tip portion of the contact portion 58 and a bottom of the groove 64g facing the contact portion 58 is smaller than the thickness T2. Therefore, the core material 40 cannot move beyond the contact portion 58 toward the side of the inner wall portion 57, with respect to the contact portion 58. Considering possibility of deformation of the hemming member 30, the distance between a tip portion of the contact portion 58 and a bottom of the groove 64g facing the contact portion 58 may be smaller than a thickness of the core material 40 in the thickness direction of the sheet-shaped member 22.

The contact portion 68 is formed at a position closer to the inner wall portion 67 than a deepest portion of the groove 64g.

The contact portion 68 has a symmetrical structure on both surface sides of the plane of symmetry with respect to the contact portion 58, except that positions of the grooves 54g and 64g in the extension direction are different. Therefore, the contact portion 68 includes a surface 68/1 (corresponding to the surface 58/1) on a side of the outer wall portion 66 and a surface 68/2 (corresponding to the surface 58/2) on a side of the inner wall portion 67.

It is not essential that the contact portions 58 and 68 have the above-described shape. The contact portion 58 may have any shape as long as the contact portion 58 is in contact with the core material 40 from a side of the outer peripheral edge portion 24 via the hemming member 30 in the frame 50, thereby restricting an inward movement of the core material 40. For example, the contact portions 58 and 68 may have a rectangular parallelepiped shape or a columnar shape.

Even when the contact portion is formed on only one of the edge housing portions of the first divided frame member 52 and the second divided frame member 62, the core material 40 can be displaced to an outer peripheral side away from the sheet-shaped member 22 in the same manner as described above.

When the first divided frame member 52 and the second divided frame member 62 are combined, for example, the outer peripheral edge portion 24 of the sheet-shaped member 22, the hemming member 30, and the core material 40 are arranged in the edge housing portion 53 of the first divided frame member 52. At this time, the core material 40 is disposed closer to the outer wall portion 56 than the contact portion 58 in the groove 54g. In this state, the first divided frame member 52 and the second divided frame member 62 are combined. Accordingly, the outer peripheral edge portion 24 of the sheet-shaped member 22, the hemming member 30, and the core material 40 are arranged in the edge housing portions 53 and 63. At this time, even when the core material 40 attempts to move toward the side of the inner wall portion 57 at a position where the contact portion 58 is provided, since the contact portion 58 is in contact with the core material 40 via the hemming member 30, the core material 40 is restricted from moving toward the side of the inner wall portion 57. Further, also at the position where the contact portion 68 is provided, the contact portion 68 is in contact with the core material 40 via the hemming member 30 by combining the first divided frame member 52 and the second divided frame member 62, and therefore the core material 40 is restricted from moving toward the side of the inner wall portion 67. Therefore, the core material 40 is restricted from moving toward an inner peripheral side of the contact portions 58 and 68 at positions where the contact portions 58 and 68 are provided.

In a state where the core material 40 is in contact with the contact portions 58 and 68 via the hemming member 30, the surfaces 54gb and 64gb of the grooves 54g and 64g on the side of the outward-facing portion 50a may or may not be in contact with the core material 40 via the hemming member 30 on sides opposite to the contact portions 58 and 68. The surfaces 54gb and 64gb are examples of surfaces that face the contact portions 58 and 68 on an outer side via the core material 40 and that restrict the outward movement of the core material 40. The surface that faces a side of the contact portion side and restricts the outward movement of the core material in this way may be a surface inclined with respect to the sheet-shaped member, or may be a surface perpendicular to the sheet-shaped member.

When a portion of the core material 40 is disposed at a position closer to the sheet-shaped member 22 than other portions, the core material 40 is pressed in a direction away from the sheet-shaped member 22 by being in contact with the contact portions 58 and 68. Particularly, when a portion of the core material 40 is disposed at a position closer to the sheet-shaped member 22 than other portions, beyond a range in which the core material 40 can be disposed between the contact portions 58 and 68 and the surfaces 54gb and 64gb of the grooves 54g and 64g, the portion of the core material 40 is pressed by the contact portions 58 and 68 in the direction away from the sheet-shaped member 22.

When the portion of the core material 40 is displaced outward by the contact portions 58 and 68, the outer peripheral edge portion 24 of the sheet-shaped member 22 connected to the core material 40 via the hemming member 30 is also pulled outward. Accordingly, an outward pulling force also acts on a portion of the sheet-shaped member 22 disposed on an inner side with respect to the outward displacement portion of the core material 40, and the slack and the wrinkles of the sheet-shaped member 22 are stretched.

The hemming member 30 includes the core material housing portion 32 that houses the core material 40. When the contact portions 58 and 68 are in contact with the core material 40 via the hemming member 30, a portion of the hemming member 30 that extends from the core material 40 toward the sewn portions 34 is pressed inward and bent by the contact portions 58 and 68. Then, since the hemming member 30 is partially bent, the sewn portion 34 on a side where the contact portions 58 and 68 are disposed is also pulled to an outside where the core material 40 is disposed. The sheet-shaped member 22 is also pulled outward by the pulling force. The pulling force can also stretch the slack and the wrinkles of the sheet-shaped member 22.

A protruding length L of the contact portions 58 and 68 may be formed to a size such that the contact portions 58 and 68 push the outer peripheral edge portion 24 of the sheet-shaped member 22 into the edge housing portions 53 and 63 facing the contact portions 58 and 68 in a state where the first divided frame member 52 and the second divided frame member 62 are combined.

That is, the protruding length L of the contact portions 58 and 68 may be set to a size to an extent that a part of the outer peripheral edge portion 24 pressed by, the contact portions 58 and 68 via the hemming member 30 can enter the edge housing portions 53 and 63 facing the contact portions 58 and 68.

In the present embodiment, the sewn portion 34 has the double structure. The sewn portions 34 and the outer peripheral edge portion 24 extend toward the core material 40 from a sewn position of the sewn portions 34 and the outer peripheral edge portion 24, and are located near top portions of the contact portions 58 and 68. When the contact portion 58 is described as an example, the contact portion 58 pushes the outer peripheral edge portion 24 toward the edge housing portion 63 via one sewn portion 34 having the double structure. In this case, for example, it may be considered that a boundary surface between the edge housing space 53S and the edge housing space 63S is a plane of symmetry being at a center between the inner surface 54f and a bottom surface of the groove 54g (that is, surfaces 54ga and 54gb) and the inner surface 64f and a bottom surface of the groove 64g (that is, surfaces 64ga and 64gb), and it may be considered that a part of the outer peripheral edge portion 24 enters the edge housing space 63S beyond the boundary surface.

For example, a length obtained by adding a thickness of two sheets included in the hemming member 30 (that is, a thickness of one sewn portion 34 having the double structure) and a thickness of the sheet-shaped member 22 to the protruding length L of the contact portion 58 may exceeds a distance from a portion of the groove 54g where the contact portion 58 is formed to the boundary surface.

Since the protruding length L of the contact portions 58 and 68 is set as described above, the outer peripheral edge portion 24 of the sheet-shaped member 22 can enter the edge housing portions 53 and 63 facing the contact portions 58 and 68. The hemming member 30 is greatly bent in accordance with a large deformation amount of the sheet-shaped member 22, so that the sheet-shaped member 22 is pulled further outward. Accordingly, the slack and the wrinkles of the sheet-shaped member 22 is stretched.

Figure 5:
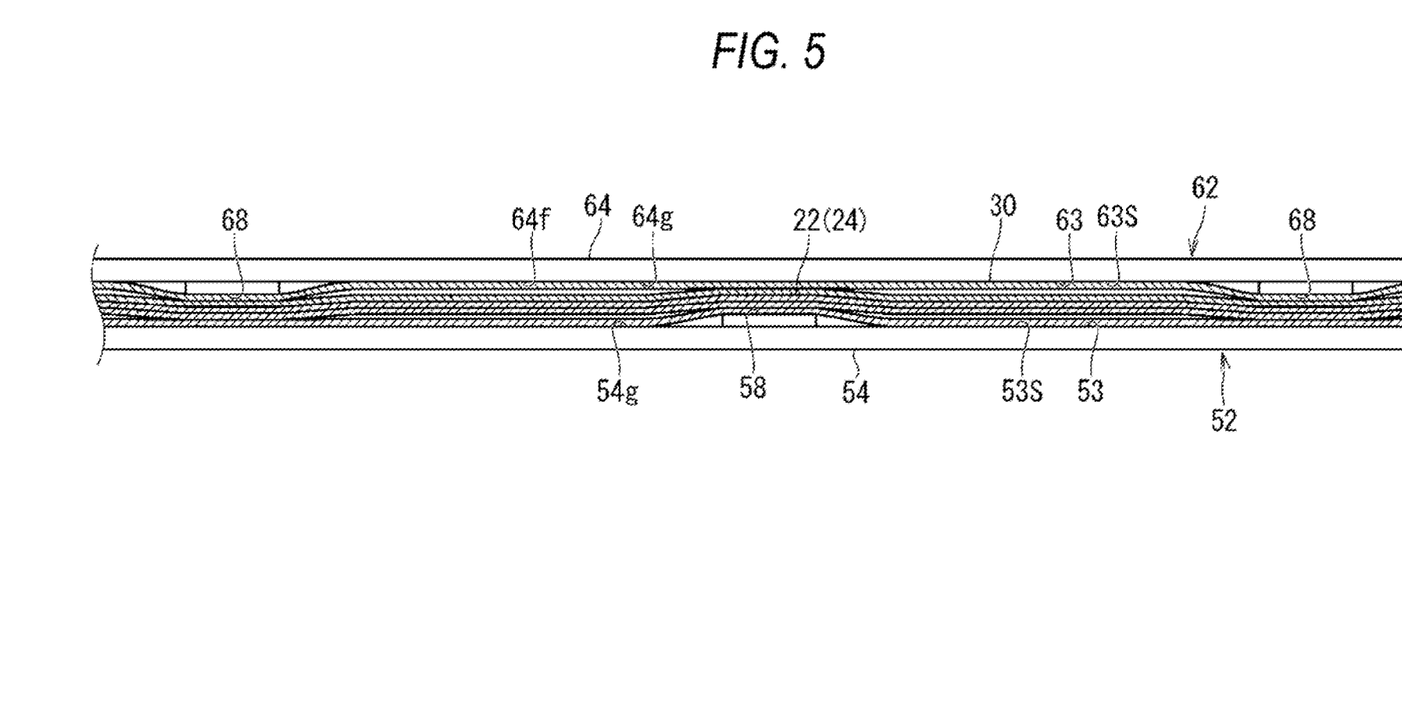
FIG. 5 is a partial cross-sectional view of a surface along grooves of the tonneau cover.

FIG. 5 shows a partial cross section along the extension direction of the grooves 54g and 64g. As shown in FIGS. 2 to 5, the contact portions 58 and the contact portions 68 may be provided at positions different from each other along a direction of the outer peripheral edge portion 24. In the present embodiment, a plurality of contact portions 58 are provided, and a plurality of contact portions 68 are also provided. The plurality of contact portions 58 and the plurality of contact portions 68 are alternately provided along the extension direction of the grooves 54g and 64g. Intervals between the contact portions 58 and the contact portions 68 may be uniform or may be different from one another. When the intervals between the contact portions 58 and the contact portions 68 are uniform, it is possible to remove slack described later as uniformly as possible in the extension direction of the grooves 54g and 64g.

When the contact portions 58 and the contact portions 68 are provided at the positions different front each other along the direction of the outer peripheral edge portion 24, a portion of the hemming member 30 that connects the core material 40 and the outer peripheral edge portion 24 is pressed in opposite directions at the positions different from each other along the direction of the outer peripheral edge portion 24. In the present embodiment, since the plurality of contact portions 58 and the plurality of contact portions 68 are alternately provided along the extension direction of the grooves 54g and 64g, the portion of the hemming member 30 that connects the core material 40 and the outer peripheral edge portion 24 is gently displaced in a zigzag manner. Accordingly, the outer peripheral edge portion 24 connected to the hemming member 30 is also gently displaced in the zigzag manner along the thickness direction of the sheet-shaped member 22 in the extension direction. Since the outer peripheral edge portion 24 is gently displaced in the zigzag manner, the sheet-shaped member 22 is pulled, and slack in a direction along the direction of the outer peripheral edge portion of the sheet-shaped member 22 can be removed.

The tonneau cover 20 is assembled, for example, as follows. First, while the core material 40 is housed in the core material housing portion 32 of the hemming member 30, the pair of sewn portions 34 of the hemming member 30 are sewn on the outer peripheral edge portion 24 of the sheet-shaped member 22. Then, the outer peripheral edge portion 24, the hemming member 30, and the core material 40 are housed in one of the first divided frame member 52 and the second divided frame member 62. For example, the outer peripheral edge portion 24, the hemming member 30, and the core material 40 are housed in the edge housing portion 53 in a state where an opening of the edge housing portion 53 of the first divided frame member 52 faces upward. In this state, the first divided frame member 52 and the second divided frame member 62 are combined, and the outer peripheral edge portion 24, the hemming member 30, and the core material 40 are housed in the edge housing portions 53 and 63. As described above, the combined state may be maintained by the lock structure, the adhesive, the screw, the rivet, or the like.

Similarly, the frames 50 are attached to the oblique sides 22c and 22d of the sheet-shaped member 22. Accordingly, the tonneau cover 20 is assembled.

According to the tonneau cover 20 configured as described above, in the combined state of the first divided frame member 52 and the second divided frame member 62, when a portion of the core material 40 where the contact portions 58 and 68 are provided is disposed more inward than other portions, the portion is pressed toward an outer side of the contact portions 58 and 68 by the contact portions 58 and 68. Accordingly, inside the portion where the contact portions 58 and 68 press the core material 40, the sheet-shaped member 22 is pulled outward, and the slack and the wrinkles are unlikely to occur in the sheet-shaped member 22.

The contact portions 58 and 68 are formed in the protruding length to push the outer peripheral edge portion 24 of the sheet-shaped member 22 into the edge housing portions 53 and 63 facing the contact portions 58 and 68 in a state where the first divided frame member 52 and the second divided frame member 62 are combined. Therefore, the outer peripheral edge portion 24 of the sheet-shaped member 22 is greatly pulled toward the outer peripheral side, and the slack and the wrinkles are more unlikely to occur in the sheet-shaped member 22.

The contact portions 58 and the contact portions 68 are provided at the positions different from each other along the direction of the outer peripheral edge portion 24. Therefore, the contact portions 58 and the contact portions 68 press the hemming member 30 in opposite directions at the positions different from each other along the direction of the outer peripheral edge portion 24. Accordingly, the hemming member 30 is gently displaced in a zigzag manner in the thickness direction of the sheet-shaped member 22. Accordingly, slack along the direction of the outer peripheral edge portion 24 of the sheet-shaped member 22 can be removed.

The two frames 50 are attached to the positions facing each other of the outer peripheral edge portion 24 of the sheet-shaped member 22. Therefore, at the two portions facing each other (here, the oblique sides 22c and 22d) of the outer peripheral edge portion 24, the two frames 50 pull the sheet-shaped member 22 toward the outer peripheral side by the contact portions 58 and 68 as described above while keeping the sheet-shaped member 22 in a posture corresponding to the shape of the frames 50. Therefore, the slack and the wrinkles of the sheet-shaped member 22 are more effectively removed.

The configurations described in the above-described embodiment and modifications can be combined as appropriate as long as they do not contradict each other.

The present specification and the drawings disclose the following aspects.

A first aspect provides a tonneau cover configured to cover a rear baggage compartment of a vehicle, the tonneau cover including: a sheet-shaped member; an hemming member sewn on an outer peripheral edge portion of the sheet-shaped member and forming an elongated core material housing space between an inner surface of the hemming member and the outer peripheral edge portion; a loop-shaped core material housed in the core material housing space; and a frame attached to at least a part of the outer peripheral edge portion of the sheet-shaped member, in which the frame includes a first divided frame member and a second divided frame member sandwiching the hemming member in at least a part of the outer peripheral edge portion of the sheet-shaped member, and at least one of the first divided frame member and the second divided frame member is formed with an edge housing portion and is provided with a contact portion, the edge housing portion forming an edge housing space between the first divided frame member and the second divided frame member, the edge housing space housing the outer peripheral edge portion of the sheet-shaped member, the hemming member, and the core material, the contact portion that protruding into the edge housing space to be in contact with a surface of the core material facing the sheet-shaped member via the hemming member.

According to the tonneau cover, the hemming member and the core material is attached to the outer peripheral edge portion of the sheet-shaped member, and the first divided frame member and the second divided frame member are combined. Further, the outer peripheral edge portion of the sheet-shaped member, the hemming member, and the core material are arranged in the edge housing space between the first divided frame member and the second divided frame member. In this state, the contact portion that protrudes into the edge housing space can be in contact with the surface of the core material facing the sheet-shaped member via the hemming member. Therefore, when the portion of the core material where the contact portion is provided is located closer to the outer peripheral edge portion of the sheet-shaped member than other portions of the core material, the portion is pressed toward the side of the outer peripheral by the contact portion. Accordingly, the portion of the outer peripheral edge portion of the sheet-shaped member where the contact portion is provided is pulled toward the side of the outer peripheral, so that the slack and the wrinkles are unlikely to occur in the sheet-shaped member.

Since the contact portion is in contact with the core material via the hemming member, the portion of the hemming member that connects the core material and the outer peripheral edge portion of the sheet-shaped member is bent toward an inside of the core material housing space. Accordingly, the outer peripheral edge portion of the sheet-shaped member to be pulled toward the core material, that is, toward the outer peripheral side. This also causes the slack and the wrinkles to be unlikely to occur in the sheet-shaped member.

A second aspect provides the tonneau cover according to the first aspect, in which the first divided frame member and the second divided frame member are provided with the edge housing portion on respective portions facing each other, and the contact portion is formed in a protruding length to push the outer peripheral edge portion of the sheet-shaped member into the edge housing portion facing the contact portion in a state where the first divided frame member and the second divided frame member are combined.

In this case, the portion of the hemming member that connects the core material and the outer peripheral edge portion of the sheet-shaped member is bent more greatly toward the inside of the core material housing space together with the outer peripheral edge portion. Accordingly, the outer peripheral edge portion of the sheet-shaped member is pulled more greatly toward the outer peripheral side, and the slack and the wrinkles are more unlikely to occur in the sheet-shaped member.

A third aspect provides the tonneau cover according to the first aspect, in which both the first divided frame member and the second divided frame member are provided with the contact portion including a first contact portion and a second contact portion, and the first contact portion provided on the first divided frame member and the second contact portion provided on the second divided frame member are provided at positions different from each other along a direction of the outer peripheral edge portion of the sheet-shaped member.

In this case, the contact portion provided on the first divided frame member and the contact portion provided on the second divided frame member press the portion of the hemming member that connects the core material and the outer peripheral edge portion of the sheet-shaped member in opposite directions at the positions different from each other along the direction of the outer peripheral edge portion of the sheet-shaped member. Therefore, slack along the direction of the outer peripheral edge portion of the sheet-shaped member can be removed.

A fourth aspect provides the tonneau cover according to the first aspect, in which the frame is attached to each of two positions on the outer peripheral edge portion of the sheet-shaped member, the two positions facing each other.

In this case, since the two frames provided on the outer peripheral edge portions of the sheet-shaped member facing each other pull the sheet-shaped member, the slack and the wrinkles are more effectively removed.

The above description is illustrative in all aspects, and the present invention is not limited thereto. It is to be understood that numerous modifications that are not illustrated can be conceived without departing from the scope of the present invention.

What is claimed is:

1. A tonneau cover configured to cover a rear baggage compartment of a vehicle, the tonneau cover comprising:
   a sheet-shaped member;
   a hemming member sewn on an outer peripheral edge portion of the sheet-shaped member and forming an elongated core material housing space between an inner surface of the hemming member and the outer peripheral edge portion;
   a loop-shaped core material housed in the core material housing space; and
   a frame attached to at least a part of the outer peripheral edge portion of the sheet-shaped member,
   wherein the frame comprises a first divided frame member and a second divided frame member sandwiching the hemming member in at least a part of the outer peripheral edge portion of the sheet-shaped member, and
   at least one of the first divided frame member and the second divided frame member is formed with an edge housing portion and is provided with a contact portion, the edge housing portion forming an edge housing space between the first divided frame member and the second divided frame member, the edge housing space housing the outer peripheral edge portion of the sheet-shaped member, the hemming member, and the core material, the contact portion protruding into the edge housing space to be in contact with a surface of the core material facing the sheet-shaped member via the hemming member.

2. The tonneau cover according to claim 1,
   wherein the first divided frame member and the second divided frame member are provided with the edge housing portion on respective portions facing each other, and
   the contact portion is formed in a protruding length to push the outer peripheral edge portion of the sheet-shaped member into the edge housing portion facing the contact portion in a state where the first divided frame member and the second divided frame member are combined.

3. The tonneau cover according to claim 1,
   wherein both the first divided frame member and the second divided frame member are provided with the contact portion including a first contact portion and a second contact portion, and
   the first contact portion provided on the first divided frame member and the second contact portion provided on the second divided frame member are provided at positions different from each other along a direction of the outer peripheral edge portion of the sheet-shaped member.

4. The tonneau cover according to claim 1,
   wherein the frame is attached to each of two positions on the outer peripheral edge portion of the sheet-shaped member, the two positions facing each other.

\* \* \* \* \*